United States Patent [19]

Murakami et al.

[11] 4,425,405

[45] Jan. 10, 1984

[54] INK JET RECORDING SHEET

[75] Inventors: Mutsuaki Murakami, Kawasaki; Yasutaka Hiromori, Hirakata; Hiroshi Naito, Machida, all of Japan

[73] Assignee: Matsushita Electric Industrial Company, Limited, Osaka, Japan

[21] Appl. No.: 294,152

[22] Filed: Aug. 19, 1981

[30] Foreign Application Priority Data

Aug. 20, 1980 [JP] Japan ................................ 55-115236

[51] Int. Cl.[3] .......................... B32B 5/16; B32B 27/10

[52] U.S. Cl. ................................ 428/342; 346/135.1; 400/126; 428/323; 428/331; 428/511; 428/537

[58] Field of Search ............... 428/323, 342, 211, 537, 428/207, 511, 331; 346/135.1; 400/126

[56] References Cited

U.S. PATENT DOCUMENTS 4,269,891 5/1981 Minagawa .................... 346/135.1 X

FOREIGN PATENT DOCUMENTS 52-53012 4/1977 Japan .................................. 428/511

52-74340 6/1977 Japan .................................. 428/511

55-5830 1/1980 Japan .................................. 428/511

55-11829 1/1980 Japan .................................. 428/511

OTHER PUBLICATIONS

Crooks et al., IBM Tech. Disclosure Bulletin, vol. 21, No. 6, Nov. 1978, p. 2505.

Abstract of Japanese Appl. No. 55-51583, Apr. 15, 1980.

*Primary Examiner*—Thomas J. Herbert, Jr.

*Attorney, Agent, or Firm*—Lowe, King, Price & Becker

[57] ABSTRACT

An ink jet recording sheet comprising a paper support applied on at least one surface thereof or internally with a composition which comprises an aqueous dispersion of polyvinylpyrrolidone, vinylpyrrolidone-vinyl acetate copolymer or a mixture thereof serving as a binder or sizing agent and a white filler. The white filler is contained in a weight ratio, to the binder, of 10:1 to 0.2:1 when the composition is applied on the surface of the paper support. When the composition is internally incorporated in the recording sheet, it comprises 10 to 60 parts by weight of the filler and 2 to 20 parts by weight of the binder per 100 parts by weight of pulp.

8 Claims, No Drawings

INK JET RECORDING SHEET

BACKGROUND OF THE INVENTION

1. Field of the Invention

This invention relates to ink jet recording and more particularly, to recording papers for the ink jet recording.

2. Description of the Prior Art

Great interest has recently been attracted to the recording by ink jet systems because of their reduced noises, ease in color recording, possibility of high speed recording, and utilization of ordinary papers. The ink jet systems are now being used widely in the field of facsimile, various types of printers and the like. It is generally accepted that ordinary papers are satisfactorily usable as recording paper for use in the ink jet recording system. However, this does not mean that all the ordinary papers which are widely used at present are usable. In order to obtain recorded matters of more excellent quality, the recording paper itself should meet several requirements which follow: (1) The paper has an excellent ink receptivity to allow ink dots deposited on the paper surface to be rapidly absorbed in the inside of paper; and (2) The paper can suppress ink dots applied on the surface from running or spreading.

The requirement (1) is the most fundamental one which must be furnished with ink jet recording papers and assumes great importance especially when color images are produced by the ink jet system. This is because in order to produce color images, it is necessary to make a variety of colors from combinations of yellow, cyan and magenta inks, so that inks of different colors are deposited on the same portion of paper surface, resulting in large amounts of inks per unit area.

The requirement (2) is necessary for obtaining clear recorded matters. By preventing ink dots from spreading, the optical density of recorded matter can be increased. In general, the simplest method of increasing the optical density of recorded matter is to increase the concentration of dye in ink. However, this method has its limit because of the tendency to clog a head nozzle. Accordingly, it is important that recording papers satisfy the above requirement.

Aside from the fundamental requirements (1) and (2), recording papers should satisfy the following further requirements: (3) The degree of penetration of ink in the direction of depth or in the longitudinal direction is not too great; and (4) The paper has an excellent brightness. The optical density of recorded matter largely depends on the state of the paper surface and if the degree of the penetration in the direction of depth is too great, it is difficult to make the optical density high.

The recording paper to be applied in the ink jet recording system is generally made from bleached chemical pulp to which fillers, dyes and, if required, sizing agents and strength improvers are added.

There have heretofore been proposed several types of papers for ink jet recording. For instance, Japanese Laid-open Patent Application No. 52-74340 discloses an ink jet recording paper which is characterized in that a ratio of an air resistance to basis weight (g/m$^2$) (air resistance/basis weight) is below 0.3 and that when an aqueous ink for ink jet recording is dropped in an amount of 0.004 ml, an absorption time of ink is in the range of from two seconds to 60 seconds. Further, Japanese Laid-open Patent Application No. 52-53012 teaches a method of making recording papers which is characterized by applying a coating to a base paper which has been incorporated with a wet strength improver known per se and which has a Stockigt sizing degree of below 1 second whereby the resulting surface coated paper has a Stockigt sizing degree of below 3 seconds. In these laid-open patent applications, there are described surface sizing agents including oxidized starch, PVA, galactomannon gum, polyacrylamide, sodium alginate, styrene-maleic acid copolymer, CMC and other cellulose derivatives, casein, soy bean protein and the like. In addition, there are mentioned, as sizing additives, hydrophobic materials or latices, rosin and its derivatives, petroleum resins, fumaric acid, maleic acid its derivatives, waxes, synthetic resins, fatty acids, alkylketene dimers and the like, and, as pigment or filler, kaolin, calcium carbonate, aluminium hydroxide, satin white, titanium oxide, and urea-formalin organic fillers.

Moreover, there is proposed in Japanese Laid-open Patent Application No. 55-5830 a sheet for ink jet recording which comprises a support and an ink-receptive layer formed on the surface of the support, said sheet having an opacity of 55.0 to 97.5%, an absorptivity of the ink-receptive layer being in the range of 1.5 to 18.0 mm/min. Also, Japanese Laid-open Patent Application No. 55-11829 teaches a sheet for ink jet recording which has (1) two or more layers, (2) an opacity of 55.0 to 97.5%, (3) a top layer with a thickness of 1.0 to 16.0 microns, and (4) an ink-receptivity of the top layer of 1.5 to 5.5 mm/min and that of a second layer of 5.5 to 60.0 mm/min.

The ink-receptive layer of these sheets is formed of white pigments such as clay, talc, diatomaceous earth, calcium carbonate, calcium sulfate, barium sulfate, titanium oxide, zinc oxide, zinc sulfide, satin white, aluminium silicate, lithopone and the like. As binder resin, there are mentioned oxidized starch, etherified starch, gelatin, casein, carboxymethyl cellulose, hydroethyethyl cellulose, polyvinyl alcohol and SBR latex.

We have made an extensive studies of ink jet recording papers which satisfy the afore-mentioned requirements (1) to (4) and found that coating layers made of combinations of sizing agents or binder resins and pigments and fillers which have been known from the prior laie-open patent applications do not show satisfactory characteristics when applied for such recording purpose. Especislly, the resins serving as the sizing agent or binder play an important role and it has been found that the known resins are unsatisfactory in ink receptivity and thus recorded matter using such resins as a surface coating frequently shows insufficient optical density.

SUMMARY OF THE INVENTION

It is accordingly an object of the present invention to provide an jet recording sheet which shows an improved optical density, when recorded, over prior art counterparts.

It is another object of the invention to provide an ink jet recording sheet which shows an excellent ink receptivity and is able to suppress ink dots from spreading.

It is a further object of the invention to provide an ink jet recording sheet which ensures a certain extent of water proof and excellent fastness of light of recorded matter.

According to one aspect of the present invention, there is provided a recording sheet for ink jet recording comprising a paper support applied with a composition on at least one surface thereof, the composition comprising an aqueous dispersion of a binder resin selected from the group consisting of polyvinylpyrrolidone, vinyl pyrrolidone-vinyl acetate copolymer and a mixture thereof which are soluble in water and a white filler used in a weight ratio to the binder of 10:1 to 0.2:1, the composition being applied in an amount of 3 to 50 g/m$^2$ on a dry basis.

According to another aspect of the present invention, there is provided a recording sheet for ink jet recording which is made from a composition comprising a mixture of 100 parts by weight of a stock pulp, 10–60 parts by weight of a while filler, and 2–20 parts by weight of a binder resin selected from the group consisting of polyvinylpyrrolidone, vinyl and pyrrolidone-vinyl acetate copolymer and a mixture thereof.

The above and other objects, features and advantages of the present invention will become apparent from the following description and the appended claims.

DETAILED DESCRIPTION AND PREFERRED EMBODIMENTS OF THE INVENTION

As having described hereinabove, one of features of the present invention resides in use of polyvinylpyrrolidone (hereinafter abbreviated as PVP) and/or vinylpyrrolidone-vinyl acetate copolymer (hereinafter abbreviated as PVP/VAc). The PVP and PVP/VAc are water-soluble polymers and have a film-forming property. They are industrially applied as cosmetics, medical supplies, adhesives, cleaning agents and soaps, fiber-finishing agents, and inks, and also in the field of lithographic printing and paper. PVP and PVP/VAc which are applied in the field of the paper-making industry are used as a decoloring agent for rags for regeneration, an improver of cellulose paper to improve its tensile strength, and a binder for the specific type of paper made of inorganic flakes or fibers.

When applied to inks making use of dyes, PVP renders the dye more readily soluble, serves to prevent gelation, and imparts deep color tone to even inks of low concentration of dye.

The PVP and PVP/VAc is soluble in water and have generally an average molecular weight of several thousands to several hundred thousands. These polymers may be ones which are prepared by any of know techniques.

The commercially available vinylpyrrolidone and vinyl acetate copolymer has a ratio of PV/VAc generally in the range of 70/30 to 30/70.

The PVP and/or PVA/VAc is used in the practice of the invention together with a white pigment or filler. Examples of the filler which is preferably used in combination with the PVP resin or PVP/VAc copolymer as will become apparent from examples appearing hereinafter include clay, talc, calcium carbonate, calcium sulfate, calcium silicate diatomaceous earth, magnesium silicate, terra abla, activated clay, magnesium oxide, magnesium carbonate and aluminium hydroxide. Aside from these, fillers which are ordinarily employed in the paper-making industry such as titanium oxide, silica, aluminium silicate, satin white, zinc oxide and the like may be usable though they are inferior in optical density and the other characteristics to those mentioned above.

In one aspect of the invention, an aqueous dispersion of the PVP and/or PVP/VAc and the filler is applied onto at least one surface of paper support. The dispersion can be readily prepared by adding a filler of a powder form to an aqueous solution of the PVP and/or PVP/VAc. In this case, a ratio of the filler to the resin is generally in the range of 10:1 to 0.2:1, preferably 1:1 to 1:2. This will be particularly described in examples appearing hereinafter. The aqueous dispersion is applied to a paper support, which may be any of papers ordinarily employed for ink jet recording purpose, in an amount of 3 to 50 g/m$^2$ on the dry basis. Preferably, the coating amount is in the range of from 10 to 30 g/m$^2$ and most preferably about 20 g/m$^2$.

In order to improve water proof, the PVP and/or PVP/VAc resin may be admixed with a sizing agent or binder which is ordinarily employed in the paper-making industry, including, for example, oxidized starch, PVA, styrene-maleic acid copolymer, CMC, and hydroxyethylcellulose. When the mixture is used, the PVP and/or PVP/VAc resin should be contained in an amount of not smaller than 33 wt% of the mixture when an added sizing agent shows little or no water absorptivity and in an amount of not smaller than 20 wt% of the mixture when an added sizing agent shows water absorptivity such as PVA.

When it is desired to control a hardness of the PVP/VAc film, there may be added to the aqueous dispersion or composition as usual plasticizers such as dimethyl phthalate, glycerine, diethylene glycol, sorbitol allysulfonamide-formaldehyde, cellulose butyrate, cellulose butyrate-propionate and the like.

In another aspect of the present invention, the aqueous dispersion or composition is mixed with stock pulp and then an ink jet recording paper is made from the mixture by any of known paper-making techniques. The paper incorporating therein the PVP and/or PVP/VAc resin and filler composition has several advantages: The making process is simple; and The PVP or PVP/VAc is readily soluble in water and is thus poor in water proof, so that when a PVP or PVP/VAc-coated paper is dipped in water, the coating layer is readily dissolved out but the internally incorporated paper has a certain degree of water proof though the filer is surely come off from the paper when dipped in water. This is experimentally confirmed that when a surface coated recording paper is vertically dipped in water, a coating layer composed of PVP or PVP/VAc and white filler is come off from the paper support in 5 to 10 seconds. On the other hand, even when the internally incorporated recording paper is dipped in water for 10 seconds, only several percent of filler is found to be come off from the paper. In addition, it takes over one minute before the pulp stock of the paper itself is reduced into pieces and dispersed in water. As a matter of course, such a time varies depending on the amount of PVP or PVP/VAc. A reason why the water proof is improved by internally applying the composition is believed due to the fact that the resin or binder component is uniformly mixed with a pulp component and thus the speed of infiltration of water becomes slow and no coating layer is come off as will be experienced in the case of the surface coating.

The internally applied recording paper can be made by one step without involving an additional coating process and is thus much simpler in manufacturing step than the surface-coated recording paper.

However, the resin and filler are usually in the case in amounts greater than those required for the surface coating technique. That is, as having defined hereinbefore, the PVP and/or PVP/VAc is used in an amount of 2 to 20 parts by weight and a white filler is used in an amount of 10 to 60 parts by weight both per 100 parts by weight of stock pulp. The amount of the white filler, of cource, varies more or less depending on the type of the filler.

In order to further and much improve the water proof of either type of the recording papers, it is favorable to add to the PVP or PVP/VAc resin binder an aqueous emulsion-type resin or a polymer soluble in alcohol which is capable of forming a water-proof film after drying. Water-soluble resin binders such as oxidized starch, PVA, CMC, hydroxyethyl cellulose and the like serve to improve the water proof as having described hereinbefore when used in combination with PVP of PVP/VAc but are not potential for such purpose. For instance, the coating layer obtained from the mixture of the water-soluble resin binder and PVP or PVP/VAc is dissolved in water in about 10 to 15 seconds and an increasing amount of the water-soluble resin binder gives an adverse influence of ink receptivity.

Examples of the aqueous emulsion useful in the practice of the invention are those of polyvinyl acetate, ethylene-vinyl acetate copolymer (having an ethylene content of below 30%), acrylic esters, water-soluble shellac and the like. Examples of polymers soluble in alcohol include polyvinyl butyral, polyacrylamide, polyamide-epichlorohydrin, shellac, polyvinyl acetate and the like. These resins are capable of forming films of relatively good water proof after drying. The amount of these resins vary depending on the type of resin and other factors including the type and amount of filler and the thickness of coating layer, but is generally in the range of 1 to 50 wt%, preferably 2 to 20 wt%, of a mixture of the resin and PVP or PVP/VAc.

In addition to these resins, various additives may be added to the PVP or PVP/VAc and filler. In particular, the resistance or the fastness to light of recorded matter is one of important problems to solve.

Then, we have made an intensive study on the light fastness or resistance. The most general way of improving the fastness to light of recorded matter is to use dyes which are excellent in fastness to light. However, since inks to be employed in the ink jet recording system are required not to cause clogging of ink jet nozzles and to have a clear color tone, dyes with excellent light fastness cannot always be employed. Basic dyes, acid dyes, or mordant dyes are clear in color tone and are now widely used for the ink jet recording purpose but these dyes are not necessarily excellent in light fastness.

The improvement of light fastness of recorded matter can be realized by adding to the aqueous dispersion or composition of PVP and/or PVP/VAc and filler (1) antioxidants, (2) UV absorber and (3) metal oxides, metal chlorides or tannic acid capable of reacting with dyes to convert the dyes into light-fast dyes.

During the course of our study, we have found that though the light fastness more or less depend on the type of dye, the light fastness of recorded matter is poorer than that of dye in liquid state and the fading is mainly caused by photooxidation based on oxygen in air and light. To prevent this, antioxidants have been found to be effective. Moreover, an investigation was conducted to know the mechanism of the fading in relation to wavelength. That is, glass filters were used to select desired ranges of wavelength and a Xenone fade meter was used to measure the resistance to light of recorded matter. As a result, it was found (1) that little fading took place in the wavelength range of infrared rays, (2) that in the range of visible light, fading occurred in a wavelength corresponding to a main absorption peak of dye; (3) that fading by the ultraviolet light was as great as in (2).

For instance, a magenta ink composed of 79% of water, 20% of ethylene glycol and 11% of Basic Violet showed light resistance as follows.

| Wavelength (mn) | Lowering Rate of Excitation Purity / Relative Value of Irradiation Energy |
|---|---|
| 250–320 | 2.32 |
| 320–380 | 1.25 |
| 440–520 | 0.97 |
| 520–620 | 2.42 |
| Over 620 | 0.024 |

From the results, it was considered that UV absorbers were efective to prevent fading of recorded matter, which was experimentally found ture.

These antioxidants, UV absorbers, and compounds capable of converting dyes into light-resistant dyes or pigments are used in amounts of 0.1 to 10 wt% of a mixture of the PVP or PVP/VAc and filler. These additives are discussed in examples.

Then, the present invention is particularly described by way of examples, which should not be construed as limiting the present invention.

It will be noted here that four types of PVP were used having average molecular weights of 360,000 (hereinafter referred to as K-90), 160,000 (hereinafter referred as K-60), 40,000 (hereinafter referred to as K-30 and 10,000 (hereinafter referred to as K-10) but little or no substantial difference in recording characteristics was observed among them and K-30 was used as the representative of PVP in examples. In addition, four types of PVP/VAc having VP/VAc ratios of 70/39, 60/40, 50/50 and 30/70, respectively, were used to check recording characteristics. As a result it was found that good results were obtained in any cases withoug showing any significant differences among them. Accordingly, a PVP/VAc resin having a VP/VAc ratio of 50/50 was used in examples as the representative for the PVP/VAc.

The ink jet recording was carried out using an On-demand-type head with a diameter of nozzle of 40 microns in which three ink jetting heads were used to discharge therefrom different types of inks including cyan, yellow and magenta. By the combination of these inks, different colors of red, green, blue and sepia were made. The discharge of ink was changed in seven stages by controlling an application voltage and the recording of 6 lines/mm was conducted. In the case of monochrome, amounts of discharge per unit area in the respective stages are $2.6\times10^{-4}$ cc/cm$^2$ in first stage, $4.7\times10^{-4}$ cc/cm$^2$ in second stage, $6.4\times10^{-4}$ cc/cm$^2$ in third stage, $7.0\times10^{-4}$ cc/cm$^2$ in fourth stage, $7.9\times10^{-4}$ cc/cm$^2$ in fifth stage, $8.7\times10^{-4}$ cc/cm$^2$ in sixth stage, and $9.4\times10^{-4}$ cc/cm$^2$ in seventh stage, respectively. In the case of blue in color, the amounts of discharge in the respective stages become double and in the case of sepia color, they become three times. Accordingly, the severest recording conditions are those for the sepia color in the seventh stage. Aside from these recordings, a recording of 2 lines/mm was also conducted for comparison.

Recorded matters were evaluated according to the following measurements or observations: (1) Measurement of optical drensity of the respective colors in the seventh stage; (2) Judgement of a stage of sepia color where inks start to run or spread so as to check a degree of the running or spreading of the inks (which show a degree of ink receptivity of paper); (3) Measurement of a time before the sepia color of the seventh stage is apparently dried after application thereof; and (4) Measurement of a rate of area of recorded matter of the first stage in which two lines/mm were recorded (to know a degree of spreading of ink dots or a degree of so-called sharpness.

EXAMPLE 1

In this example, calcium carbonate was used as a white pigment and different types of binder resins were used including PVP and PVP/VAc to be used in the present invention.

To a 5% aqueous solution or dispersion of each binder resin was added 15 wt% of calcium carbonate of a powder form having a size of 0.1 to 0.2 microns, followed by fan agitating to give a slurry. This slurry was applied onto a commercially available groundwood paper by means of a wire bar, followed by roll pressing to obtain a surface-coated paper. The coated layer had a thickness of 5 to 20 microns, i.e. 0.3–2.0 g of the coating was applied onto an A-4 size paper.

The respective recording papers thus made were subjected to the recording procedure and evaluated according to the measuring methods described hereinabove. The test results are shown in Table 1.

TABLE 1

| Binder resin | Optical density | Stage where spreading starts to appear | Drying time (seconds) | Rate of area (%) |
|---|---|---|---|---|
| PVP | 1.03 | >7 | <10 | 14.4 |
| PVP/VAc | 0.99 | >7 | <10 | 14.8 |
| Oxydized starch | 1.14 | 4 | 180 | 11.2 |
| Polyacrylamide | 0.52 | 2 | 200 | 20.5 |
| PVA | 0.96 | 6 | 60 | 15.0 |
| Sodium aluginate | 0.83 | 4 | 180 | 20.1 |
| Styrene-maleic acid copolymer | 0.78 | 4 | 250 | 22.2 |
| CMC | 0.87 | 5 | 220 | 17.6 |
| Casein | 0.82 | 3 | 320 | 13.2 |
| Soybean protein | 0.72 | 3 | 300 | 14.6 |
| Gelatin | 0.83 | 5 | 240 | 21.5 |
| SBR latex | 0.69 | 4 | 450 | 18.9 |
| Hydroxyethyl cellulose | 0.85 | 6 | 80 | 18.2 |
| Etherified starch | 0.69 | 5 | 170 | 17.6 |

In this table, the optical density was determined with respect to the magenta color of the seventh stage and other six colors showed a similar tendency.

As will be clearly seen from the results of Table 1, the binder resin gives a great influence on the characteristics of ink spreading, drying time and the like and the PVP/VAc resins involve no spreading or running at the seventh stage and are thus much more excellent than the other binder resins. PVA and hydroxyethyl cellulose rank second to PVP and PVP/VAc with respect to optical density but these resins were inferior in spreading characteristic, i.e. spreading occurred at the sixth stage, and required a drying time of as long as 60 to 80 seconds. As to the optical density and rate of area, oxidized starch was excellent and PVP and PVP/VAc showed such characteristics next to oxidized starch.

EXAMPLE 2

In this example, PVP and PVP/VAc were used as a binder resin and different types of white pigments were used in combination for comparative purpose.

To a 10% aqueous solution of PVP or PVP/VAc was added each of white pigments to be tested to give a slurry in the same manner as in Example 1 and the slurry was applied in the same manner as in Example 1 to obtain a surface coated paper. The type and amount of white pigment and the results of recorded matter are shown in Table 2 below with regard to the PVP binder resin.

TABLE 2

| White pigment (amount by wt.) | Optical density | Stage where spreading starts to appear | Drying time (seconds) | Rate of area (%) | Whitely fading phenomenon |
|---|---|---|---|---|---|
| clay (20%) | 1.11 | 6 | 15 | 13.7 | no |
| talc (20%) | 1.00 | >7 | <10 | 11.5 | no |
| calcium carbonate (20%) | 1.11 | >7 | <10 | 14.9 | no |
| calcium sulfate (20%) | 0.97 | >7 | <10 | 12.0 | no |
| calcium silicate (10%) | 0.97 | >7 | <10 | 10.4 | no |
| diatomaceous earth (15%) | 0.98 | 7 | <10 | 16.5 | no |
| aluminium hydroxide (20%) | 0.92 | 7 | 14 | 13.9 | no |
| titanium oxide (20%) | 0.85 | 6 | 15 | 14.8 | yes |
| silica (20%) | 0.82 | 7 | 20 | 14.5 | yes |
| aluminium silicate (20%) | 0.87 | 7 | 20 | 10.9 | yes |
| satin white (20%) | 0.80 | 7 | 15 | 11.7 | yes |
| zinc oxide (20%) | 0.87 | 7 | 15 | 13.9 | yes |

As will be appreciated from the results of Table 2, with titanium oxide, silica, aluminum silicate, satin white and zinc oxide, there appears a whitely fading phenomenon where an entirety of image is observed as white and the optical density does not become higher than 0.9. This is because an ink does not remain on the surface of the coated paper and the white pigment deposits out on the paper surface. In contrast thereto, clay, talc, calcium carbonate, calcium sulfate, calcium silicate, diatomaceous earth and aluminium hydroxide show no fading phenomenon and optical densities of above 0.9. The white pigments causing the fading phenomenon cannot be used in large amounts and do not show an effect of increasing the whiteness of paper though usable in the practice of the invention. In this sense, the white pigments showing no fading phenomenon are conveniently and preferably used. Preferable pigments further include magnesium silicate, terra abla, activated clay, magnesium oxide and magnesium carbonate. As regards the spreading characteristic and drying time, there is not a significant difference depending on the type of pigment, revealing that such characteristics are mainly dependent of the type of binder.

In Table 2, the binder used was PVP and similar results were obtained when PVP/VAc was used except that the optical density was reduced by about 0.5 in all the cases.

EXAMPLE 3

In this example, PVP was used as binder resin and calcium carbonate, calcium silicate and talc were used as pigment to determine an effect of a ratio by weight of the binder and the white pigment on the recording characteristics. The coated paper was made in the same manner as in Example 1. In Table 3, there are shown results of a test using calcium carbonate.

TABLE 3

| PVP (%) | Calcium carbonate | Optical density | Stage where spreading starts to appear | Drying time (seconds) | Rate of area (%) | Whitely fading phenomenon |
|---|---|---|---|---|---|---|
| 2 | 20 | 0.85 | 7 | 15 | 14.8 | yes |
| 5 | 20 | 0.98 | >7 | <10 | 16.3 | no |
| 10 | 20 | 1.11 | >7 | <10 | 13.0 | no |
| 15 | 20 | 1.19 | >7 | <10 | 12.2 | no |
| 20 | 20 | 1.24 | >7 | <10 | 6.5 | no |
| 20 | 15 | 1.12 | >7 | <10 | 9.7 | no |
| 20 | 10 | 0.97 | >7 | <10 | 11.6 | no |
| 20 | 5 | 0.84 | >7 | <10 | 14.8 | no |
| 20 | 2 | 0.75 | >7 | <10 | 20.0 | no |
| 20 | 1 | 0.58 | >7 | <10 | 32.0 | no |

As will be clear from the results of Table 3, high optical density cannot be obtained when amounts of PVP and calcium carbonate are too great or too small. That is, in order to obtain good recording characteristics, a PVP/calcium carbonate (with an average size of 0.1 to 0.2 microns) ratio by weight is preferably in the range of 10:1 to 0.25:1. When a similar test was conducted using a calcium silicate powder having an average particle size of 0.1 micron and a talc powder having an average size of 0.2 to 0.3 microns, it was found that a preferable weight ratio was in the range of 10:1 to 0.5:1 for calcium silicate and 5:1 to 0.2:1 for talc. The weight ratio is, of course, dependent on the size of white pigment and the weight ratio of PVP or PVP/VAc and a white pigment is conveniently in the range of 10:1 to 0.2:1.

Furthermore, when the composition comprising calcium carbonate and PVP was applied in different thicknesses ranging from 4 microns to 28 microns, no significant difference in recording characteristics was found in this range of thicknesses.

In addition, four types of paper support showing different water absorptivities were used to check their influence on the recording characteristics. As a result, it was found that when the coated layer had a thickness of above 8 microns, inclusive, good results were obtained in any cases.

From the above, the coated layer should preferably have a thickness of 8 microns or more, and the coating composition of the invention can be widely applied to a wide variety of paper supports.

EXAMPLE 4

In this example, PVP and other binder resins were used in combination. As a white pigment, talc (Chinese talc) were used. Amounts of the binder resin and talc were, respectively, 20%. Coated papers were made substantially in the same manner as in Example 1, with the results summarized in Table 4 below.

TABLE 4

| Binder resin | Weight ratio | Optical density | Stage where spreading starts appear | Drying time (seconds) | Rate of area (%) |
|---|---|---|---|---|---|
| PVP/PVA | 1/1 | 0.94 | >7 | <10 | 12.9 |
| PVP/PVA | 1/2 | 0.94 | >7 | 13 | 12.5 |
| PVP/PVA | 1/5 | 0.92 | 7 | 40 | 12.7 |
| PVP/oxidized starch | 1/1 | 1.10 | >7 | 24 | 10.4 |
| PVP/oxidized starch | 1/2 | 1.06 | 7 | 53 | 11.8 |
| PVP/oxidized starch | 1/5 | 0.92 | 6 | 190 | 13.0 |
| PVP/styrene-maleic copolymer | 1/1 | 0.86 | 7 | 50 | 15.5 |
| PVP/styrene-copolymer | 1/2 | 0.86 | 7 | 62 | 16.9 |
| PVP/styrene-copolymer | 1/5 | 0.89 | 5 | 280 | 22.0 |
| PVP/-hydroxyethyl cellulose | 1/1 | 0.93 | >7 | 18 | 13.7 |

As will be appreciated from the above results, binder resins such as PVA, oxidized starch and the like show more excellent ink receptivity when applied in combination with PVP.

A greater amount of PVP is desirable in view of the ink receptivity. Though the content of PVP depends on the type of the second binder, it is in the range of over 20 wt% when the binder resin used in combination with PVP shows water absorptivity such as PVA and in the range of 33 wt% when the second binder resin shows no water absorptivity.

EXAMPLE 5

In this example, characteristics of ink jet recording papers made by a size press technique are described.

Different types of binder and calcium carbonate were mixed in a ratio of 1:1 in an aqueous medium to obtain 10% slurries. Each slurry was coated on a commercially available groundwood paper by a size press system to obtain a surface coated paper with a coating spread of 4.0 g/m$^2$. The results are shown in Table 5 below.

TABLE 5

| Binder resin | Weight ratio | Optical density | Stage where spreading starts appear | Drying time (seconds) | Rate of area (%) |
|---|---|---|---|---|---|
| PVP | | 1.18 | >7 | <10 | 11.0 |
| PVP/VAc | | 0.98 | >7 | <10 | 13.0 |
| PVP/PVA | 1/1 | 0.96 | >7 | 18 | 14.7 |
| PVP/-oxidized starch | 1/1 | 1.14 | 7 | 20 | 12.5 |

From the above results, it will be seen that the characteristics of the recording papers made by the size press technique are substantially the same as those of the recording papers obtained by the wire bar. For instance, the recording paper of the coated type using PVP/VAc as binder had an optical density of 0.99, a spreading stage of >7, a drying time of <10, and a rate of area of <10 as shown in Table 1, which are almost the same as those of Table 5. In the PVP/PVA and PVP/oxidized starch systems, the recording characteristics are almost the same as those of Table 4. Accordingly, the size press technique can be used similarly with the surface coating method.

EXAMPLE 6

In this example, binder resins and calcium carbonate used as white pigment were applied internally or mixed with pulp.

LBKP and NBKP were mixed in a ratio of 1:2 and beaten in a refiner. Then, light calcium carbonate was added to the pulp in an amount of 30 parts by weight per 100 parts by weight of the pulp and PVP or PVP/VAc was added in an amount of ranging from 0.5 to 30 wt% based on the pulp. The pulp composition was subjected to a paper-making process using a Fourdriner test machine to maker a paper with a basis weight of 70 g/m$^2$. The thus made papers were each subjected to the calender rolls to give recording papers.

The recording papers were applied with inks and evaluated in the same manner as described hereinbefore, with the result shown in Table 6 below.

TABLE 6

| Binder resin | Amount (%) | Optical density | Stage where spreading starts to appear | Drying time (seconds) | Rate of area (%) |
|---|---|---|---|---|---|
| PVP | 0.5 | 0.80 | 6 | 15 | 19.3 |
| PVP | 1 | 0.85 | 7 | 10 | 17.5 |
| PVP | 2 | 0.96 | >7 | <10 | 15.6 |
| PVP | 5 | 0.98 | >7 | <10 | 15.4 |
| PVP | 10 | 1.00 | >7 | <10 | 15.0 |
| PVP | 20 | 1.00 | >7 | <10 | 15.1 |
| PVP | 30 | 1.01 | >7 | <10 | 15.3 |
| PVP/VAc | 0.5 | 0.72 | 5 | 20 | 20.1 |
| PVP/VAc | 1 | 0.82 | 6 | 15 | 17.9 |
| PVP/VAc | 2 | 0.92 | 7 | 10 | 16.1 |
| PVP/VAc | 5 | 0.95 | >7 | 10 | 16.0 |
| PVP/VAc | 10 | 0.98 | >7 | <10 | 15.9 |
| PVP/VAc | 20 | 0.98 | >7 | <10 | 15.9 |
| PVP/VAc | 30 | 0.98 | >7 | <10 | 15.5 |

In the table, the optical density is obtained from the magenta color of the seventh stage and as regards the other six colors, a similar tendency is observed.

As will be appreciated from the above results, where the binder content is 0.5% or 1%, the optical density, stage where spreading appeared, drying time and rate of area are not satisfactory. Accordingly, the binder resin should be contained in an amount of at least 2% of the pulp. This is much larger as compared with an amount of an strength improver ordinarily employed in the paper-making industry (generally in the range of 0.2 to 1 wt%). On the other hand, the recording papers in which 30% of PVP or PVP/VAc based on the pulp is contained show excellent recording characteristics but become sticky to the touch. In addition, such papers show a blocking tendency.

Gathering the above, the content of PVP or PVP/VAc is in the range of 2 wt% to 20 wt% of the pulp.

EXAMPLE 7

In this example, an amount of PVP was set at 10% by weight of pulp but an amount of calcium was changed. Recording papers were each made and evaluated in the same manner as in Example 6. The test results are shown in Table 7 below.

TABLE 7

| White filler | Amount (%) | Optical density | Stage where spreading starts to appear | Drying time (seconds) | Rate of area (%) |
|---|---|---|---|---|---|
| calcium carbonate | 3 | 0.83 | 7 | 20 | 21.0 |
| calcium carbonate | 5 | 0.91 | 7 | 15 | 16.5 |
| calcium carbonate | 10 | 0.96 | >7 | <10 | 15.2 |
| calcium carbonate | 20 | 1.01 | >7 | <10 | 14.9 |
| calcium carbonate | 40 | 1.00 | >7 | <10 | 15.0 |
| calcium carbonate | 50 | 0.97 | >7 | <10 | 14.1 |
| calcium carbonate | 60 | 0.83 | >7 | <10 | 12.4 |
| calcium carbonate | 70 | 0.45 | >7 | <10 | 10.3 |

As will be apparent from the above results, good recording characteristics are obtained when the content of the white filler is in the range of 10 to 60 wt% of the pulp. Less contents are disadvantageous in that the optical density is poor while larger contents lead to the whitely fading phenomenon. Accordingly, an effective amount of calcium carbonate is in the range of 10 to 60 wt% of the pulp. In this connection, the content of calcium carbonate more or less depends on the content of PVP, e.g. when the content of PVP is 2%, the upper limit in content of calcium carbonate was found to be 40%. Similar results were obtained when PVP/VAc was used instead of PVP.

The above procedure was repeated using other several white pigments in different amounts. As a result, it was found that a suitable content of clay was in the range of 10 to 60 wt% of the pulp, that of talc ranged from 10 to 60 wt%, that of calcium sulfate ranged from 5 to 40 wt%, that of calcium silicate ranged from 10 to 40 wt%, that of diatomaceous earth ranged from 10 to 60 wt%, that of satin white ranged from 5 to 50 wt%, and that of zinc oxide ranged from 15 to 40 wt%. Generally speaking, white pigments are effectively usable in tha range of 10 to 60 wt% of pulp. Other usable white pigments in this internal application technique are aluminium hydroxide, silica, aluminium silicate, magnesium silicate, terra abla, activated clay, magnesium oxide, magnesium carbonate, aluminium oxide and the like. Among the white pigments, preferable ones are those mentioned with respect to the surface coating method.

The following three examples illustrate water-proof, film-forming resins added to the basic composition used in the present invention.

EXAMPLE 8

In this example, binder resin made of 90 parts by weight of PVP and 10 parts by weight of different types of film-forming polymers were used.

To 10% aqueous or alcoholic solutions of various binder resin mixtures was added calcium carbonate powder with a size of 0.1 to 0.2 microns in an amount of as great as three times the binder resin mixture, followed by agitating with a fan to give slurries. Each slurry was applied onto a commercially available groundwood paper by a wire bar and the thus applied paper was roll pressed to obtain surface coated papers. The thickness of the coated layer was in the range of 5 to 20 microns. The thus obtained papers were recorded and evaluated in the same manner as in Example 1 except for water proof. That is, the water proof was evaluated as follows: a time before the coated layer was completely separated from a coated paper specimen with a size of 1 cm×2 cm after having immersed the coated paper vertically in water was measured. The test results are shown in Table 8 below.

TABLE 8

| Binder resin mixture | Optical density | Stage where ink spreading starts to appear | Drying time (seconds) | Rate of area (%) | Water proof |
|---|---|---|---|---|---|
| PVP | 1.03 | >7 | <10 | 14.4 | 5 |
| PVP/VAc | 0.99 | >7 | <10 | 14.8 | 5 |
| PVP + oxidized starch | 1.11 | >7 | 14 | 10.0 | 7 |
| PVP + PVA | 1.00 | >7 | 10 | 12.2 | 5 |
| PVP + hydroxyethyl cellulose | 0.98 | >7 | 12 | 13.1 | 5 |
| PVP + polyvinyl acetate | 0.95 | 7 | 15 | 14.5 | 25 |
| PVP + ethylene/vinyl-acetate copolymer | 0.94 | 7 | 19 | 13.9 | 30 |
| PVP + acrylic ester resin | 0.97 | 7 | 17 | 13.9 | 25 |
| PVP + water-soluble shellac | 1.01 | 7 | 13 | 12.8 | 40 |
| PVP + polyvinyl butyral* | 0.98 | 7 | 15 | 14.5 | 35 |
| PVP + polyacrylamide* | 0.95 | 7 | 14 | 14.3 | 20 |
| PVP + polyamide.epichlorohydrin* | 0.93 | 7 | 14 | 13.9 | 25 |
| PVP + shellac* | 1.00 | 7 | 13 | 14.5 | 60 |

*Note: These resins were dissolved in methanol.

From the above results, it will be appreciated that when PVP or PVP/VAc is used singly, the water proof is 5 seconds or less. In addition, systems of PVP or PVP/VAc to which other water-soluble polymers such as oxidized starch, PVA and hydroxyethyl cellulose have been added show a slight improvement in water proof. On the other hand, binder resin mixtures in which 10 wt% of aqueous emulsion-type polymers such as polyvinyl acetate, ethylene-vinyl acetate copolymer, acrylic ester resin and water-soluble shellac show a water proof of over 25 seconds, thus improving the water proof remarkably. These binder resin mixtures are slightly inferior in recording characteristics, i.e. the spreading stage of seven and a drying time of 13–19, to the PVP or PVP/VAc resin alone. However, these slight degrees of deterioration of the characteristics are almost negligible and the improvement in water proof is much more effective. Similar results are obtained when polyvinyl butyral, polyacrylamide, polyamide.epichlorohydrin, shellac and the like are used as dissolved in methanol solvent.

Aside from the resins mentioned above, other resins are also usable in combination with PVP and/or PVP/VAc including vinyl acetate-acrylonitrile complymer, styrene resin, styrene-acrylonitrile copolymer, methacrylic ester resin, polyamide resin, melamine resin, melamine-urea resin and the like.

EXAMPLE 9

In this example, an influence of polyvinyl acetate in a binder resin composed of PVP and polyvinyl acetate was checked. To an aqueous 10% solution of the binder resin was added talc (Chinese talc) in an amount of two times the binder resin to give a slurry. Then, Example 8 was repeated with the results shown in Table 9.

TABLE 9

| Binder resin | Weight ratio | Optical density | Stage where ink spreading starts to appear | Drying time (sec) | Rate of area (%) | Water proof |
|---|---|---|---|---|---|---|
| PVP/polyvinyl acetate | 98/2 | 1.04 | 7 | 10 | 14.7 | 5 |
| PVP/polyvinyl acetate | 95/5 | 1.02 | 7 | 12 | 14.3 | 18 |
| PVP/polyvinyl acetate | 90/10 | 0.97 | 7 | 15 | 14.8 | 25 |
| PVP/polyvinyl acetate | 80/20 | 0.98 | 7 | 19 | 14.2 | 33 |
| PVP/polyvinyl acetate | 60/40 | 0.95 | 7 | 20 | 14.2 | 45 |
| PVP/polyvinyl acetate | 50/50 | 0.95 | 6 | 23 | 14.7 | 60 |
| PVP/polyvinyl acetate | 40/60 | 0.93 | 5 | 49 | 15.2 | 100 |
| PVP/polyvinyl acetate | 20/80 | 0.93 | 5 | 125 | 16.6 | 120 |

As will clear from the above results, the proof to water is more improved as the amount of polyvinyl acetate is increased. However, the optical density, spreading characteristic and drying time become more deteriorated with an increasing amount of polyvinyl acetate. For instance, the drying time is 49 seconds for the binder system of PVP/polyvinyl acetate=40/60. This time is longer than a time of from completion of image formation till withdrawal of the recorded matter from a machine and is not thus practical. Taking the above into consideration, a maximum amount of polyvinyl acetate should be 50%, i.e. it is necessary that polyvinyl acetate does not exceed that of PVP. On the other hand, the binder system containing 2% of polyvinyl acetate does show little effects and thus polyvinyl acetate should be over 2%.

The above procedure was repeated using different types of film-forming and water-proof polymers to determine the range of addition of each polymer which may more or less depend on the type and amount of white pigment, and thickness of the coated layer. The results are shown in Table 10.

TABLE 10

| Binder resin | Possible range of addition |
|---|---|
| PVP/ethylene-vinyl acetate copolymer | 98/2–60/40 on a weight basis |
| PVP/acrylic ester resin | 98/2–60/40 |
| PVP/water shellac | 99/1–70/30 |
| PVP/polyvinyl butyral | 99/1–70/30 |

TABLE 10-continued

| Binder resin | Possible range of addition |
|---|---|
| PVPpolyacrylamide | 99/1-70/30 |
| PVP/polyamide.epichlorohydrin | 99/1-60/40 |
| PVP/shellac | 99/1-70/30 |
| PVP.VAc/polyvinyl acetate | 98/2-50/50 |
| PVP.VAc/ethylene-vinyl acetate copolymer | 98/2-60/40 |
| PVP.VAc/acrylic ester resin | 98/2-60/40 |
| PVP.VAc/water shellac | 99/1-70/30 |
| PVP.VAc/polyvinyl butyral | 99/1-70/30 |
| PVP.VAc/polyacrylamide | 99/1-70/30 |
| PVP.VAc/polyamide.epichlorohydrin | 99/1-60/40 |
| PVP/shellac | 99/1-70/30 |

From the above results, it is generally possible to use these water proof-imparting resins in the range of 1 to 50 wt% of the mixture with PVP or PVP/VAc provided that the type and amount of white pigment and the thickness of the coated layer are properly controlled.

EXAMPLE 10

In this example, characteristics of ink jet recording papers made by the size press technique are shown.

Various binders (PVP:additive polymer=90:10) and calcium carbonate were mixed in a weight ratio of 1:2 to give 10% slurries. Each slurry was applied onto a commercially vailable groundwood paper by the size press method in an amount of 4.0 g/m$^2$ on a dry basis to give a surface coated paper. The thus obtained coated papers had recording characteristics shown in Table 11.

TABLE 11

| Binder resin | Optical density | Stage where ink spreading starts to appear | Drying time (seconds) | Rate of area (%) | Water proof (seconds) |
|---|---|---|---|---|---|
| PVP | 1.04 | 7 | 10 | 14.2 | 5 |
| PVP/VAc | 1.00 | 7 | 10 | 14.6 | 5 |
| PVP/polyvinyl acetate | 0.95 | 7 | 14 | 14.3 | 31 |
| PVP/-acrylic ester resin | 0.98 | 7 | 20 | 14.0 | 23 |
| PVP/polyvinyl butyral | 0.97 | 7 | 15 | 14.3 | 40 |
| PVP/water shellac | 1.01 | 7 | 15 | 13.0 | 45 |
| PVP/ethylene-vinyl acetate copolymer | 0.94 | 7 | 18 | 14.5 | 35 |
| PVP VAc/-polyvinyl acetate | 0.93 | 7 | 17 | 14.8 | 40 |

As will be clearly seen from the above results, the characteristics of the recording papers made by the size press method are excellent similarly to those of the recording papers made by the wire bar coating method. As for the water proof, the recording papers made by the size press method are slightly superior to those obtained by the wire bar coating method. Thus, the size press technique can be used similarly with the surface coating method.

The following examples deal with the manner of imparting light resistance to recorded matter in which antioxidants, Ultraviolet absorbers and compounds capable of reacting with dyes for converting into light-resistant dyes.

The measurement of light resistance was conducted according to a method as prescribed in JIS L0843-71 using a 2.5 KW xenon fade meter of an air-cooling type (made by Suga Tester K.K.). The irradiation energy was 464 J/cm$^2$.Hr, which is 9.6 times that of an average sunlight and 380 times that of a fluorescent lamp.

The ink jet recording was carried out using an On-demand-type head having a nozzle diameter of 40 microns and a voltage of 200 V was applied to the recording system. When a recording of 6 lines/mm$^2$ was effected, a discharge per unit area was $7.9\times10^{-4}$ cc/cm$^2$.

Recording papers used were made by applying onto a commercially available high quality paper three types of coating composition comprising three types of binders of polyvinyl alcohol, oxidized starch/polyvinyl alconol (30/70) and polyvinyl alcohol/polyvinylpyrrolidone (40/60) and calcium carbonate as white filler in a binder-to-filler ratio of 1:1, respectively. The coating amount was 40 g/m$^2$. The three types of recording papers were designated as recording papers A, B and C respectively. Antioxidants, UV absorbers and the specific type of compounds capable of reacting with dyes were dissolved in binder to make recording papers. It will be noted that these additives are effective for any recording papers which are to be applied with dyes for recording purpose and application of these additives to recording papers outside the scope of the invention is also described in the following examples to evidence the excellency of these additives.

EXAMPLE 11

Various metal oxides and organic acids were added to the binders in such an amount that they were contained in the surface coating in an amount of 0.5 g/m$^2$. Then, recording papers were made substantially in the same manner as in the foregoing examples.

Then, a magenta ink made of 79% by weight of water, 20% by weight of ethylene glycol and 1% by weight of C.I. Basic Violet 10 was prepared and used for recording on the respective recording papers. The recorded papers were irradiated for 12 hours in the xenone fade meter and their optical density was measured. The test results are shown in Table 12 below.

TABLE 12

| Recording paper | Additive | Optical Density (O.D.) Irradiation time (0 hour) | Irradiation time (12 hours) | O.D.(12 hours)/ O.D.(0 hours) |
|---|---|---|---|---|
| A | nil | 0.93 | 0.41 | 0.44 |
| A | phosphorus tungstic acid | 0.84 | 0.68 | 0.81 |
| A | phosphorus molybdic acid | 0.89 | 0.82 | 0.92 |
| A | phosphorus tungsten molybdic acid | 0.91 | 0.88 | 0.97 |
| A | chromic chloride | 0.88 | 0.83 | 0.94 |
| A | tannic acid | 0.99 | 0.99 | 1.00 |
| B | nil | 0.97 | 0.42 | 0.43 |
| B | phosphorus tungstic acid | 0.91 | 0.78 | 0.92 |
| B | phosphorus molybdic acid | 0.93 | 0.86 | 0.92 |
| B | phosphorus tungsten molybdic acid | 0.96 | 0.90 | 0.94 |
| B | chromic | 0.89 | 0.84 | 0.94 |

TABLE 12-continued

| Recording paper | Additive | Optical Density (O.D.) Irradiation time (0 hour) | Irradiation time (12 hours) | O.D.(12 hours)/ O.D.(0 hours) |
|---|---|---|---|---|
| | chloride | | | |
| B | tannic acid | 0.99 | 0.98 | 0.99 |
| C | nil | 0.88 | 0.35 | 0.40 |
| C | phosphorus tungstic acid | 0.85 | 0.62 | 0.73 |
| C | phosphorus molybdic acid | 0.88 | 0.81 | 0.92 |
| C | phosphorus tungsten molybdic acid | 0.87 | 0.82 | 0.94 |
| C | chromic chloride | 0.81 | 0.76 | 0.94 |
| C | tannic acid | 0.92 | 0.82 | 0.89 |

As will be seen from the above results, the additives are found to remarkably improve the light resistance of recorded matter. In practice, the phosphorus-containing acids are preferably used because of their excellency in color retentivity.

EXAMPLE 12

Various inks composed of 76 to 79% by weight of water 20% by weight of ethylene glycol and 1 to 4% by weight of different types of dyes were made and applied on a recording paper D which was made by applying 0.5 g/m$^2$ of phosphorous molybdic acid to the recording paper A and a recording paper E applied with 0.5 g/m$^2$ of tannic acid similarly to the case of the recording paper D.

The light resistance was measured in the same manner as in Example 11 with the results shown in Table 13 below.

TABLE 13

| Record ing paper | Dye | Optical Density (O.D) Irradiation time (0 hour) | Irradiation time (12 hours) | O.D.(12 hours)/ O.D.(0 hour) |
|---|---|---|---|---|
| A | C.I. Basic Yellow 11 | 0.57 | 0.39 | 0.69 |
| D | C.I. Basic Yellow 11 | 0.59 | 0.49 | 0.83 |
| E | C.I. Basic Yellow 11 | 0.61 | 0.52 | 0.85 |
| A | C.I. Basic Red 1 | 0.79 | 0.35 | 0.44 |
| D | C.I. Basic Red 1 | 0.77 | 0.53 | 0.69 |
| E | C.I. Basic Red 1 | 0.71 | 0.51 | 0.72 |
| A | C.I. Basic Red 3 | 0.78 | 0.56 | 0.72 |
| D | C.I. Basic Red 3 | 0.75 | 0.54 | 0.85 |
| E | C.I. Basic Red 3 | 0.74 | 0.62 | 0.84 |
| A | C.I. Basic Violet 14 | 0.97 | 0.37 | 0.38 |
| D | C.I. Basic Violet 14 | 0.91 | 0.63 | 0.69 |
| E | C.I. Basic Violet 14 | 0.93 | 0.69 | 0.75 |
| A | C.I. Basic Blue 3 | 0.79 | 0.46 | 0.58 |
| D | C.I. Basic Blue 3 | 0.77 | 0.57 | 0.74 |
| E | C.I. Basic Blue 3 | 0.73 | 0.55 | 0.77 |
| A | C.I. Mordant | 0.41 | 0.30 | 0.73 |

TABLE 13-continued

| Record ing paper | Dye | Optical Density (O.D) Irradiation time (0 hour) | Irradiation time (12 hours) | O.D.(12 hours)/ O.D.(0 hour) |
|---|---|---|---|---|
| | Orange 4 | | | |
| D | C.I. Mordant Orange 4 | 0.39 | 0.30 | 0.77 |
| E | C.I. Mordant Orange 4 | 0.42 | 0.32 | 0.77 |
| A | C.I. Mordant Red 15 | 0.77 | 0.59 | 0.77 |
| D | C.I. Mordant Red 15 | 0.72 | 0.61 | 0.85 |
| E | C.I. Mordant Red 15 | 0.75 | 0.67 | 0.89 |
| A | C.I. Mordant Violet 5 | 0.71 | 0.62 | 0.87 |
| D | C.I. Mordant Violet 5 | 0.73 | 0.67 | 0.92 |
| E | C.I. Mordant Violet 5 | 0.68 | 0.62 | 0.91 |
| A | C.I. Mordant Black 7 | 0.82 | 0.75 | 0.91 |
| D | C.I. Mordant Black 7 | 0.79 | 0.75 | 0.95 |
| E | C.I. Mordant Black 7 | 0.83 | 0.78 | 0.94 |
| A | C.I. Acid Yellow 17 | 0.51 | 0.21 | 0.41 |
| D | C.I. Acid Yellow 17 | 0.53 | 0.44 | 0.83 |
| E | C.I. Acid Yellow 17 | 0.52 | 0.47 | 0.90 |
| A | C.I. Acid Orange 7 | 0.63 | 0.42 | 0.69 |
| D | C.I. Acid Orange 7 | 0.63 | 0.49 | 0.78 |
| E | C.I. Acid Orange 7 | 0.63 | 0.58 | 0.92 |
| A | C.I. Acid Red 88 | 0.80 | 0.38 | 0.47 |
| D | C.I. Acid Red 88 | 0.82 | 0.63 | 0.77 |
| E | C.I. Acid Red 88 | 0.78 | 0.70 | 0.89 |
| A | C.I. Acid Violet 49 | 0.92 | 0.32 | 0.35 |
| D | C.I. Acid Violet 49 | 0.95 | 0.71 | 0.75 |
| E | C.I. Acid Violet 49 | 0.90 | 0.75 | 0.83 |
| A | C.I. Acid Blue 7 | 0.81 | 0.72 | 0.88 |
| D | C.I. Acid Blue 7 | 0.80 | 0.77 | 0.96 |
| E | C.I. Acid Blue 7 | 0.83 | 0.81 | 0.98 |
| A | C.I. Acid Black 2 | 1.00 | 0.83 | 0.83 |
| D | C.I. Acid Black 2 | 1.03 | 0.98 | 0.95 |
| E | C.I. Acid Black 2 | 1.03 | 1.02 | 0.99 |
| A | C.I. Acid Black 31 | 0.94 | 0.86 | 0.91 |
| D | C.I. Acid Black 31 | 0.93 | 0.91 | 0.98 |
| E | C.I. Acid Black 31 | 0.95 | 0.94 | 0.99 |

From the above results, it will be seen that the phosphorus molybdic acid and tannic acid showed a very remarkable effect of light resistance on the basic dyes and acid dyes and a fair effect on the mordant dyes. However, little effects on the direct dyes and disperse dyes were recognized.

In these examples 11 and 12, five compounds are illustrated and other effective additives includes halides and oxides of at least one metal such as of barium, manganese, iron, copper, calcium, magnesium, cobalt and nickel.

The amount of these additives varies depending on the type thereof but is generally in the range of 0.1 to 10% by weight of the coating composition in case of the surface-coated recording paper. Larger amounts give an adverse effect on the recording characteristics.

As will be appreciated from the results of Example 11, the additives show their light-resistant effect independently of the type of coating. Further, their effect is also developed when the additives are incorporated in paper or applied by dipping paper in solutions of the additives. This is particularly described in Example 13 and 14.

EXAMPLE 13

A commercially available high quality paper showing a relatively high degree of water absorptivity was used on which recording was conducted by an ink jet recording technique using an ink as used in Example 11. After completion of the recording, the recorded matter was dipped in acetone or methanol solutions of 2 wt% of phosphorus tungstic acid, phosphorus molybdic acid, phosphorus tungsten molybdic acid, chromic chloride and tannic acid, then dried, and subjected to the measurement of light resistance. The results are shown in Table 14.

TABLE 14

| | Optical Density (O.D) | | |
|---|---|---|---|
| Additive | Irradiation time (0 hour) | Irradiation time (12 hours) | D.C.(12 hours)/ D.C.(0 hours) |
| nil | 0.88 | 0.40 | 0.45 |
| phosphorus tungstic acid | 0.91 | 0.66 | 0.73 |
| phosphorus molybdic acid | 0.83 | 0.76 | 0.92 |
| phosphorus tungsten molybdic acid | 0.88 | 0.85 | 0.97 |
| chromic chloride | 0.83 | 0.79 | 0.97 |
| tannic acid | 0.95 | 0.93 | 0.98 |

These additives can improve the light resistance of recorded matter when applied by the dipping method as will be seen from the above results.

EXAMPLE 14

LBKP having a freeness (C.S.F) of 400 ml was used as stock pulp to which were added 10 wt% of talc, 0.2 wt% of a wet strength improver and 0.5 wt% of additives each based on the solid component of pulp. The thus added pulps were each used to make papers with a basis weight of 50 g/m$^2$ in a usual manner.

Then, an ink with the same composition as used in Example 13 was used to record on the thus made papers and the recorded matters were subjected to the measurement of light resistance. The results are shown in Table 15 below.

TABLE 15

| | Optical Density (O.D.) | | |
|---|---|---|---|
| Additive | Irradiation time (0 hour) | Irradiation time (12 hours) | D.C.(12 hours)/ D.C.(0 hours) |
| nil | 0.82 | 0.40 | 0.49 |
| phosphorus tungstic acid | 0.86 | 0.68 | 0.79 |

TABLE 15-continued

| | Optical Density (O.D.) | | |
|---|---|---|---|
| Additive | Irradiation time (0 hour) | Irradiation time (12 hours) | D.C.(12 hours)/ D.C.(0 hours) |
| phosphorus molybdic acid | 0.79 | 0.77 | 0.97 |
| phosphorus tungsten molybdic acid | 0.84 | 0.80 | 0.95 |
| chromic chloride | 0.79 | 0.71 | 0.90 |
| tannic acid | 0.91 | 0.89 | 0.98 |

The additive-incorporated papers show improved light resistance over the additive-free paper.

EXAMPLE 15

Example 11 was repeated using various antioxidants, with the results shown in Table 16 below, in which the three recording papers are indicated as A', B' and C' corresponding to recording papers A, B and C or Example 11.

TABLE 16

| | | Optical density | | |
|---|---|---|---|---|
| Recording paper | Antioxidant | Irradiation time (0 hr) | Irradiation time (12 hrs) | O.D.(12 hrs)/ O.D.(0 hr) |
| A' | nil | 0.93 | 0.41 | 0.44 |
| " | hydroquinone | 0.95 | 0.95 | 1.00 |
| " | hydroquinon dimethyl ether | 0.97 | 0.70 | 0.72 |
| " | butylhydroxyanisole | 0.93 | 0.82 | 0.88 |
| " | p-tert-butylphenol | 0.97 | 0.65 | 0.67 |
| " | p-tert-butylcatechol | 0.97 | 0.97 | 1.00 |
| " | 2,6-di-tert-butyl-phenol | 1.00 | 0.98 | 0.98 |
| " | 2,6-tert-butyl-p-cresol | 0.99 | 0.57 | 0.57 |
| " | methylhydroquinone | 0.92 | 0.85 | 0.92 |
| " | 2,2'-azobis-isobutyronitrile | 0.87 | 0.53 | 0.61 |
| " | benzotriazole | 0.94 | 0.43 | 0.46 |
| " | diphenylamine | 0.94 | 0.73 | 0.78 |
| " | 1,1-diphenyl-2-picryhydrazine | 1.01 | 0.84 | 0.83 |
| " | pyrogallol | 0.94 | 0.84 | 0.89 |
| B' | nil | 0.97 | 0.42 | 0.43 |
| " | hydroquinone | 0.99 | 0.97 | 0.98 |
| " | hydroquinone dimethyl ether | 1.00 | 0.69 | 0.69 |
| " | butylhydroxyanisole | 0.99 | 0.84 | 0.85 |
| " | p-tert-butylphenol | 1.04 | 0.75 | 0.72 |
| " | p-tert-butylcatechol | 1.07 | 1.03 | 0.96 |
| " | 2,6-di-tert-butylphenol | 1.05 | 1.03 | 0.98 |
| " | 2,6-di-tert-butyl-p-cresol | 1.06 | 0.66 | 0.62 |
| " | methylhydroquinone | 0.98 | 0.95 | 0.97 |
| " | 2,2'-azobis-isobutyronitrile | 0.89 | 0.64 | 0.72 |
| " | benzotriazole | 1.03 | 0.49 | 0.48 |
| " | diphenylamine | 1.01 | 0.81 | 0.80 |
| " | 1,1-diphenyl-2-picryl-hydrazine | 1.09 | 0.93 | 0.85 |
| " | pyrogallol | 1.00 | 0.91 | 0.91 |
| C' | nil | 0.88 | 0.35 | 0.40 |
| " | hydroquinone | 0.92 | 0.90 | 0.98 |
| " | hydroquinone dimethyl ether | 0.96 | 0.69 | 0.72 |
| " | butylhydroxyanizole | 0.91 | 0.80 | 0.88 |
| " | p-tert-butylphenol | 0.95 | 0.60 | 0.63 |
| " | p-tert-butylcatechol | 0.90 | 0.89 | 0.99 |
| " | 2,6-di-tert- | 0.97 | 0.95 | 0.98 |

TABLE 16-continued

| Recording paper | Antioxidant | Optical density Irradiation time (0 hr) | Irradiation time (12 hrs) | O.D.(12 hrs)/ O.D.(0 hr) |
|---|---|---|---|---|
| | butylphenol | | | |
| " | 2,6-di-tert-butyl-p-cresol | 0.97 | 0.47 | 0.48 |
| " | methylhydroquinone | 0.90 | 0.75 | 0.83 |
| " | 2,2'-azobis-isotutyronitrile | 0.81 | 0.43 | 0.53 |
| " | benzotriazole | 0.91 | 0.38 | 0.42 |
| " | diphenylamine | 0.88 | 0.50 | 0.57 |
| " | 1,1-diphenyl-2-picrylhydrazine | 0.97 | 0.76 | 0.78 |
| " | pyrogallol | 0.91 | 0.81 | 0.89 |

These results reveal that the addition of antioxidants can remarkably improve the light resistance. The degree of the improvement more or less depends on the type of antioxidant and hydroquinone, p-tert-butylcatechol, 2,6-di-tert-butylphenol and methylhydroquinone are particularly excellent in improving the light resistance.

Aside from those mentioned above, there are usable styrenated phenol, 2,2'-methylenebis(4-ethyl-6-t-butylphenol), 4,4'-butylidenebis(3-methyl-6-t-butylphenol), 4,4'-thiobis(3-methyl-6-t-butylphenol), 2,2'-thiobis(4-methyl-6-t-butylphenol), alkylthiodi propionates, 2-mercaptobenzoimidazole, N-n-butyl-p-aminophenol, phenylenediamines, α-naphtylamine, N-phenyl-α-naphthylamine, N,N'-disalicylidene-1,2-propylenediamine, phenothiazine, tris(nonylphenyl)phosphite, triphenylphosphite, tris(3,5-di-t-butyl-4,4-hydroxyphenylphophate, dithiocarbamate, anthogenate, dihydrquinoline derivatives, mercaptobenzimidazoles, monoisopropyl citrate, ethyl protocathecuate, alkyl gallates, nordihydroguaiaretic acid, L-sorbic acid, and the like.

EXAMPLE 16

Various inks composed of 77 to 79 wt% of water, 20% by weight of ethylene glycol and 1 to 3% by weight of different types of dyes were made and applied on a recording paper D' which was made by incorporating 0.5 g/m$^2$ of methylhydroquinone in the recording paper A'. The light resistance was measured in the same manner as in Example 15. The results are shown in Table 17 below.

TABLE 17

| Recording paper | Dye | Optical Density (O.D.) Irradiation time (0 hr) | Irradiation time (12 hrs) | O.D.(12 hrs)/ O.D.(0 hr) |
|---|---|---|---|---|
| D' | C.I. Basic Violet 14 | 0.95 | 0.90 | 0.95 |
| A' | C.I. Basic Violet 14 | 0.97 | 0.37 | 0.38 |
| D' | C.I. Basic Blue 3 | 0.79 | 0.73 | 0.92 |
| A' | C.I. Basic Blue 3 | 0.79 | 0.46 | 0.58 |
| D' | C.I. Basic Yellow 11 | 0.53 | 0.51 | 0.97 |
| A' | C.I. Basic Yellow 11 | 0.57 | 0.39 | 0.69 |
| D' | C.I. Basic Red 1 | 0.78 | 0.69 | 0.89 |
| A' | C.I. Basic Red 1 | 0.79 | 0.35 | 0.44 |
| D' | C.I. Basic Red 13 | 0.77 | 0.75 | 0.97 |

TABLE 17-continued

| Recording paper | Dye | Optical Density (O.D.) Irradiation time (0 hr) | Irradiation time (12 hrs) | O.D.(12 hrs)/ O.D.(0 hr) |
|---|---|---|---|---|
| A' | C.I. Basic Red 13 | 0.78 | 0.56 | 0.72 |
| D' | C.I. Acid Yellow 17 | 0.57 | 0.52 | 0.92 |
| A' | C.I. Acid Yellow 17 | 0.51 | 0.21 | 0.81 |
| D' | C.I. Acid Orange 7 | 0.61 | 0.47 | 0.77 |
| A' | C.I. Acid Orange 7 | 0.63 | 0.43 | 0.69 |
| D' | C.I. Acid Red 88 | 0.82 | 0.57 | 0.70 |
| A' | C.I. Acid Red 88 | 0.80 | 0.38 | 0.47 |

From the above results, it will be seen that though an influence of the antioxidants on the light resistance varies depending on the type of dye, good results are obtained in all the cases. Accordingly, the addition of antioxidant is believed effective in improving the light resistance by application to various types of dye.

The amount of the antioxidants also varies depending on the type but is generally in the range of 0.1 to 10% by weight of the coating composition when such composition is applied by the surface coating technique. Larger amounts give an adverse effect on the recording characteristics.

The antioxidants can also be applied by dipping paper in solutions of antioxidants or internally incorporated paper. This is particularly described in examples which follow.

EXAMPLE 17

A commercially available high quality paper showing a relatively high degree of water absorptivity was used and an ink jet recording using an ink of C.I. Basic Violet 10 was conducted on such paper. The recorded paper was then dipped an acetone solution of each of antioxidants (2 wt%) for 2 seconds. After drying, the light resistance of the dipped paper was measured using the xeon fade meter. The results are shown in Table 18 below.

TABLE 18

| Antioxidant | Optical Density (O.D.) Irradiation time (0 hour) | Irradiation time (12 hours) | O.D. (12 hrs)/ O.D. (0 hr) |
|---|---|---|---|
| nil | 0.91 | 0.38 | 0.42 |
| hydroquinone | 0.91 | 0.89 | 0.98 |
| p-tert-butylcatechol | 0.93 | 0.92 | 0.99 |
| 2,2-di-tert-butylphenol | 0.93 | 0.90 | 0.97 |
| methylhydroquinone | 0.88 | 0.86 | 0.98 |
| butylhydroxyanisole | 0.88 | 0.83 | 0.94 |
| diphenylamine | 0.90 | 0.79 | 0.88 |
| pyrogallol | 0.89 | 0.80 | 0.90 |

As will be seen from the above results, the dipping method is also effective in improving the light resistance similarly to the surface coating method.

EXAMPLE 18

LBKP having a freeness (C.S.F) of 400 ml was used as starting pulp to which were added 10 wt% of talc, 2 wt% of a wet strength improver and 0.5 wt% of antioxidants each based on the solid component of pulp. The thus added pulps were each used to make papers with a basis weight of 50 g/m$^2$ in a usual manner.

Then, an ink with the same composition as used in Example 17 was used and applied on the thus made papers, followed by measuring the light resistance. The results are shown in Table 19 below.

TABLE 19

| Antioxidant | Optical Density (O.D.) Irradiation time (0 hour) | Irradiation time (12 hours) | O.D. (12 hrs)/ O.D. (0 hr) |
|---|---|---|---|
| nil | 0.85 | 0.38 | 0.45 |
| hydroquinone | 0.86 | 0.81 | 0.94 |
| p-tert-butylcatechol | 0.89 | 0.83 | 0.93 |
| 2,6-di-tert-butylphenol | 0.90 | 0.83 | 0.92 |
| methylhydroquinone | 0.85 | 0.80 | 0.94 |
| butylhydroxyanisole | 0.84 | 0.79 | 0.94 |
| diphenylamine | 0.88 | 0.75 | 0.85 |
| pyrogallol | 0.83 | 0.79 | 0.95 |

Thus, the incorporation of the antioxidants in paper is also effective in improving the light resistance.

EXAMPLE 19

Example 11 was repeated using various UV adsorbers, with the results shown in Table 20 below, in which the three recording papers are indicated as A'', B'' and C'' corresponding to recording papers A, B and C of Example 11.

TABLE 20

| Recording paper | UV absorber | Optical Density (O.D.) Irradiation time (0 hr) | Irradiation time (12 hrs) | O.D.(12 hrs)/ O.D.(0 hr) |
|---|---|---|---|---|
| A'' | nil | 0.93 | 0.41 | 0.44 |
| " | 2-hydroxy-4-octoxybenzophenone | 1.00 | 0.79 | 0.79 |
| " | 2-hydroxy-4-methoxybenzophenone | 0.96 | 0.83 | 0.86 |
| " | phenylsalicylate | 0.91 | 0.70 | 0.77 |
| " | p-t-butylphenyl salicylate | 0.92 | 0.77 | 0.83 |
| B'' | nil | 0.97 | 0.42 | 0.43 |
| " | 2-hydroxy-4-octoxybenzophenone | 1.02 | 0.83 | 0.81 |
| " | 2-hydroxy-4-methoxybenzophenone | 0.98 | 0.82 | 0.84 |
| " | phenyl salicylate | 0.94 | 0.71 | 0.76 |
| " | p-t-butylphenyl salicylate | 0.93 | 0.74 | 0.80 |
| C'' | nil | 0.88 | 0.35 | 0.40 |
| " | 2-hydroxy-4-octoxybenzophenone | 0.98 | 0.85 | 0.87 |
| " | 2-hydroxy-4-methoxybenzophenone | 0.91 | 0.76 | 0.84 |
| " | phenyl salicylate | 0.89 | 0.67 | 0.75 |
| " | p-t-butylphenyl salicylate | 0.90 | 0.69 | 0.77 |

These results show that the addition of the UV absorbers is effective in improving the light resistance.

EXAMPLE 20

Various inks composed of 77 to 79 wt% of water, 20 wt% of ethylene glycol and 1 to 3 wt% of various dyes were made and applied on a recording paper D' which was made by incorporating 0.5 g/m$^2$ of 2-hydroxy-4-octoxybenzophenone as UV a bsorber in the coating layer of the recording paper A''. The light resistance was measured in the same manner as in Example 19. The results are shown in Table 21 below.

TABLE 21

| Recording paper | Dye | Optical Density (O.D.) Irradiation time (0 hr) | Irradiation time (12 hrs) | O.D.(12 hrs)/ O.D.(0 hr) |
|---|---|---|---|---|
| A'' | C.I. Basic Violet 14 | 0.97 | 0.37 | 0.38 |
| D'' | C.I. Basic Violet 14 | 0.99 | 0.81 | 0.82 |
| A'' | C.I. Basic Blue 3 | 0.79 | 0.46 | 0.58 |
| D'' | C.I. Basic Blue 3 | 0.83 | 0.75 | 0.90 |
| A'' | C.I. Basic Yellow 11 | 0.57 | 0.39 | 0.69 |
| D'' | C.I. Basic Yellow 11 | 0.59 | 0.51 | 0.86 |
| A'' | C.I. Basic Red 1 | 0.79 | 0.35 | 0.44 |
| D'' | C.I. Basic Red 1 | 0.81 | 0.70 | 0.86 |
| A'' | C.I. Basic Red 13 | 0.78 | 0.56 | 0.72 |
| D'' | C.I. Basic Red 13 | 0.77 | 0.68 | 0.88 |
| A'' | C.I. Basic Yellow 17 | 0.51 | 0.21 | 0.41 |
| D'' | C.I. Basic Yellow 17 | 0.54 | 0.41 | 0.76 |
| A'' | C.I. Acid Orange 7 | 0.63 | 0.43 | 0.69 |
| D'' | C.I. Acid Orange 7 | 0.63 | 0.58 | 0.92 |
| A'' | C.I. Acid Red 88 | 0.80 | 0.38 | 0.47 |
| D'' | C.I. Acid Red 88 | 0.77 | 0.69 | 0.90 |
| A'' | C.I. Acid Violet 49 | 0.92 | 0.32 | 0.35 |
| D'' | C.I. Acid Violet 49 | 0.91 | 0.85 | 0.93 |
| A'' | C.I. Acid Blue 7 | 0.81 | 0.72 | 0.88 |
| D'' | C.I. Acid Blue 7 | 0.85 | 0.78 | 0.92 |
| A'' | C.I. Acid Black 2 | 1.00 | 0.83 | 0.83 |
| D'' | C.I. Acid Black 2 | 1.05 | 1.04 | 0.99 |
| A'' | C.I. Acid Black 31 | 0.94 | 0.86 | 0.91 |
| D'' | C.I. Acid Black 31 | 0.95 | 0.91 | 0.96 |
| A'' | C.I. Direct Yellow 50 | 0.48 | 0.34 | 0.71 |
| D'' | C.I. Direct Yellow 50 | 0.49 | 0.43 | 0.88 |
| A'' | C.I. Direct Red 80 | 0.71 | 0.47 | 0.66 |
| D'' | C.I. Direct Red 80 | 0.70 | 0.60 | 0.86 |

The influence of the benzophenone on the light resistance more or less depends on the type of UV absorber but good results are obtained in all cases.

When the UV absorbers are applied by the surface coating technique, they are generally used in an amount of 0.1 to 10 wt% of the coating composition of binder and filler. Similarly to the antioxidants and compounds capable of reacting with dye, larger amounts give an adverse effect on the recording characteristics.

EXAMPLE 21

A commercially available high quality paper showing a relatively high degree of water absorptivity was used and an ink jet recording using an ink of C.I. Basic Violet 10 was conducted on such paper. The recorded paper was then dipped in an acetone solution of each of UV absorbers (2 wt%) and dried, after which it was subjected to the measurement of light resistance. The results are shown in Table 22 below.

TABLE 22

| | Optical Density (O.D.) | | |
|---|---|---|---|
| UV absorber | Irradiation time (0 hr) | Irradiation time (12 hrs) | O.D. (12 hrs)/ O.D.(0 hr) |
| nil | 0.90 | 0.38 | 0.42 |
| 2-hydroxy-4-octoxy-benzophenone | 0.93 | 0.71 | 0.76 |
| 2-hydroxy-4-methoxy-benzophenone | 0.91 | 0.77 | 0.85 |
| phenyl salicylate | 0.89 | 0.68 | 0.76 |
| p-t-butylphenyl salicylate | 0.90 | 0.59 | 0.66 |

As will be clear from the above results, the dipping method is effective in improving the light resistance.

EXAMPLE 22

LBKP having a freeness (C.S.F) of 400 ml was used as starting pulp to which were added 10 wt% of talc, 2 wt% of a wet strength improver and 0.5 wt% of UV absorbers each based on the solid component of pulp. The thus added pulp were used to make papers with a basis weight of 50 g/m$^2$ in a usual manner.

Then an ink with the same composition as used in Example 21 was used and applied on the thusmade papers, followed by measuring the light resistance. The results are shown in Table below.

TABLE 23

| | Optical Density (O.D.) | | |
|---|---|---|---|
| UV absorber | Irradiation time (0 hr) | Irradiation time (12 hrs) | O.D. (12 hrs)/ O.D. (0 hr) |
| nil | 0.82 | 0.39 | 0.47 |
| 2-hydroxy-4-octoxy-benzophenone | 0.88 | 0.63 | 0.72 |
| 2-hydroxy-4-methoxy-benzophenone | 0.85 | 0.67 | 0.79 |
| phenyl salicylate | 0.85 | 0.58 | 0.68 |
| p-t-butylphenyl salicylate | 0.81 | 0.51 | 0.63 |

The UV absorbers can be effectively utilized even by the internal application method as will be apparently seen from the above results.

What is claimed is:

1. A recording sheet for ink jet recording comprising a paper support having a composition coated on at least one surface thereof, said composition comprising an aqueous dispersion of a binder resin selected from the group consisting of polyvinylpyrrolidone, vinylpyrrolidone-vinyl acetate copolymer and mixtures thereof, and a white filler used in a weight ratio to said binder of 10:1 to 0.2:1, said composition being applied in an amount of 3 to 50 g/m$^2$ on a dry basis.

2. A recording sheet according to claim 1, wherein said binder is polyvinylpyrrolidone.

3. A recording sheet according to claim 1, wherein said binder is vinylpyrrolidone-vinyl acetate copolymer.

4. A recording sheet according to claim 1, wherein said white filler is clay, talc, calcium carbonate, calcium sulfate, calcium silicate, diatomaceous earth, magnesium silicate, terra abla, activated clay, magnesium oxide, magnesium carbonate or aluminium hydroxide in the form of a powder.

5. A recording sheet according to claim 1, further comprising a binder resin used in combination with the first-mentioned binder resin, said first-mentioned binder resin being used in an amount of at least 20 wt% of the combination when the second-mentioned binder resin shows water absorptivity or in an amount of at least 33 wt% of the combination when said second-mentioned binder resin shows little water absorptivity.

6. A recording sheet according to claim 1, further comprising a plasticizer to control hardness of the film formed from the binder resin.

7. A recording sheet according to claim 1, wherein said binder resin further comprises an aqueous emulsion-type of resin or an alcohol-soluble resin, which has water proof characteristics when dried in the form of a film, in an amount of 1 to 50 wt% based on the combination with said binder resin, whereby the resulting coating becomes water proof.

8. A recording sheed according to claim 1, wherein the ratio is in the range of 1:1 to 1:2.

* * * * *